US011336687B2

(12) United States Patent
Beardsley et al.

(10) Patent No.: US 11,336,687 B2
(45) Date of Patent: May 17, 2022

(54) SYSTEM AND METHOD FOR PROVIDING SECURITY FOR MASTER CLOCKS (71) Applicant: Disney Enterprises, Inc., Burbank, CA (US)

(72) Inventors: Craig L. Beardsley, Chicago, IL (US); Michael J. Strein, Bohemia, NY (US)

(73) Assignee: Disney Enterprises, Inc., Burbank, CA (US)

(*) Notice: Subject to any disclaimer, the term of this patent is extended or adjusted under 35 U.S.C. 154(b) by 316 days.

(21) Appl. No.: 16/734,128

(22) Filed: Jan. 3, 2020

(65) Prior Publication Data
US 2021/0211461 A1 Jul. 8, 2021

(51) Int. Cl.
*H04L 29/06* (2006.01)
*H04L 69/325* (2022.01)
(Continued)

(52) U.S. Cl.
CPC ........ *H04L 63/1483* (2013.01); *H04J 3/0602* (2013.01); *H04J 3/0658* (2013.01);
(Continued)

(58) Field of Classification Search
CPC ...... H04J 3/0641; H04J 3/0602; H04J 3/0688; H04J 3/0644; H04J 3/0658; H04L 7/0008;
(Continued)

(56) References Cited

U.S. PATENT DOCUMENTS 9,112,630 B1 * 8/2015 Mizrahi ............... H04J 3/0641
10,162,790 B2 12/2018 Wei
(Continued)

FOREIGN PATENT DOCUMENTS

| CN | 107925492 A | 4/2018 |
| WO | 2017130034 A1 | 8/2017 |
| WO | 2019063607 A1 | 4/2019 |

OTHER PUBLICATIONS

Itkin, Eyal & Wool, Avishai. (2016). A security analysis and revised security extension for the precision time protocol. 1-6. 10.1109/ISPCS.2016.7579501.*

(Continued)

*Primary Examiner* — Chirag R Patel
(74) *Attorney, Agent, or Firm* — Patterson + Sheridan, LLP (57) ABSTRACT

Embodiments describe monitoring network activity and behavior of authorized clocks to identify suspicious activity, and in response, removing a clock for an authorized clock list. In one embodiment, a network monitor detects changes in profiles corresponding to the authorized clocks such as a disconnecting from a port, changing a network location, unexpected changes in the clock signal, changes to the clock ID or MAC address, and the like. If the network monitor deems these changes suspicious, it removes the clock from the authorized clock list. When the current master clock fails, the PTP endpoints select a new master clock only if that clock is included in the authorized clock list. In this manner, the network monitor can constantly update the authorized clock list to ensure it contains only clocks that have not been tampered with or replaced with rogue clocks.

20 Claims, 5 Drawing Sheets

(51) Int. Cl.
*H04L 7/00* (2006.01)
*H04L 43/08* (2022.01)
*H04J 3/06* (2006.01)

(52) U.S. Cl.
CPC .......... *H04J 3/0688* (2013.01); *H04L 7/0008* (2013.01); *H04L 43/08* (2013.01); *H04L 69/325* (2013.01)

(58) Field of Classification Search
CPC ... H04L 7/0025; H04L 63/1483; H04L 43/08; G06F 11/1479; G06F 1/06
See application file for complete search history.

(56) References Cited

U.S. PATENT DOCUMENTS

2013/0227008 A1* 8/2013 Yang ................ H04J 3/0641 709/204
2019/0007151 A1 1/2019 Goel et al.
2021/0181787 A1* 6/2021 Chan ................ G06F 21/445

OTHER PUBLICATIONS

E. Itkin and A. Wool, "A Security Analysis and Revised Security Extension for the Precision Time Protocol," in IEEE Transactions on Dependable and Secure Computing, vol. 17, No. 1, pp. 22-34, Jan. 1-Feb. 2020, doi: 10.1109/TDSC.2017.2748583.*

Tai Mizrahi, "Security Requirements of Time Protocols in Packet Switched Networks," TICTOC Working Group, Apr. 23, 2014, 33 pages.

Cisco ASR 9000 Series Aggregation Services Router System Management Command Refernce, Release 5.1.x, Oct. 30, 2017, 45 pages.

Thomas Kemen and Nikolaus Kero, "Strategies for Securing ST 2059-2 PTP Networks," 2010, 19 pages.

Thomas Kemen and Nikolaus Kero, "Strategies for Securing ST 2059-2 PTP Networks," SMPTE 2019, 24 pages.

* cited by examiner

SYSTEM AND METHOD FOR PROVIDING SECURITY FOR MASTER CLOCKS

BACKGROUND

The Precision Time Protocol (PTP) is defined by the Institute of Electrical and Electronics Engineers (IEEE®) 1588 standard and adopted by the Society of Motion Picture and Television Engineers® (SMPTE®) 2059. The PTP standard provides a timestamp that has 80 bits of precision and is accurate to the microsecond range. Generally, SMPTE 2059 is directed to leveraging PTP to provide timestamps for video data that is encapsulated in Internet Protocol (IP) packets. Using these protocols, PTP time reference data can be shared throughout a network to provide a synchronized clock to media nodes (e.g., cameras, audio devices, video encoders, audio encoders, etc.) connected to the network. That is, the switches and other network devices distribute clock signals (e.g., timestamps) that can synchronize local clocks to a master clock.

When the current master clock fails, candidate clocks broadcast announcement messages to PTP endpoints. The endpoints use the information in these message to perform a Best Master Clock (BMC) algorithm as defined in IEEE 1588 to select the next master clock. Because the endpoints follow the same protocol and assuming they all receive the same announcement messages, each PTP endpoint selects the same candidate clock to use as the next master clock.

However, PTP does not consider security issues that may arise from a nefarious actor plugging a rogue clock into the network. The nefarious actor can configure the announcement message advertised by the rogue clock so that the endpoints select it as the next master clock. Once selected, the nefarious actor can change the clock of the PTP endpoints, which can cause communication failure and other problems in the network. PTP (as well as the Network Time Protocol (NTP)) currently have very limited security mechanisms in place to prevent rogue clocks from being selected as master clocks for a network.

SUMMARY

One embodiment described herein is a method and a non-transitory computer-readable medium that includes identifying a plurality of candidate master clocks connected to a network where clock IDs corresponding to the candidate master clocks are stored in an authorized clock list, monitoring network activity corresponding to the plurality of candidate master clocks, determining suspicious activity associated with a first clock of the plurality of candidate master clocks, removing a clock ID of the first clock from the authorized clock list, and selecting, using the authorized clock list, a master clock from the plurality of candidate master clocks.

Another embodiment described herein is a system that includes a network, a plurality of candidate master clocks connected to the network where clock IDs corresponding to the candidate master clocks are stored in an authorized clock list, and a network monitor configured to monitor network activity corresponding to the plurality of candidate master clocks, determine suspicious activity associated with a first clock of the plurality of candidate master clocks, and remove a clock ID of the first clock from the authorized clock list where the first clock is no longer a candidate master clock once removed from the authorized clock list. The network further includes a plurality of endpoints connected to the network and configured to select, using the authorized clock list, a master clock from the plurality of candidate master clocks.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The embodiments herein describe monitoring network activity and behavior of authorized clocks to identify suspicious activity, and in response, remove a clock from an authorized clock list. In one embodiment, a network monitor detects changes in profiles corresponding to the authorized clocks such as a disconnecting from a port, changing a network location, unexpected changes in the clock signal, changes to the clock ID or MAC address, and the like. If the network monitor deems these changes suspicious, it removes the clock from the authorized clock list. When the current master clock fails, the PTP endpoints select a new master clock only if that clock is included in the authorized clock list. In this manner, the network monitor can constantly update the authorized clock list to ensure it contains only clocks that have not been tampered with or replaced with rogue clocks. Advantageously, the embodiments herein provide a secure process for vetting and maintaining a list of authorized master clocks which serve as backups to the currently selected master clock. Unlike prior solutions where candidate master clocks are unregulated, here the candidate master clocks must be authorized before they can be selected as a master clock.

While the embodiments herein primarily discuss authorizing master clocks that use PTP, the embodiments herein can be expanded to any protocol that relies on a predefined algorithm to be used by endpoints to select a master clock, such as NTP or any future timing protocol.

Figure 1:
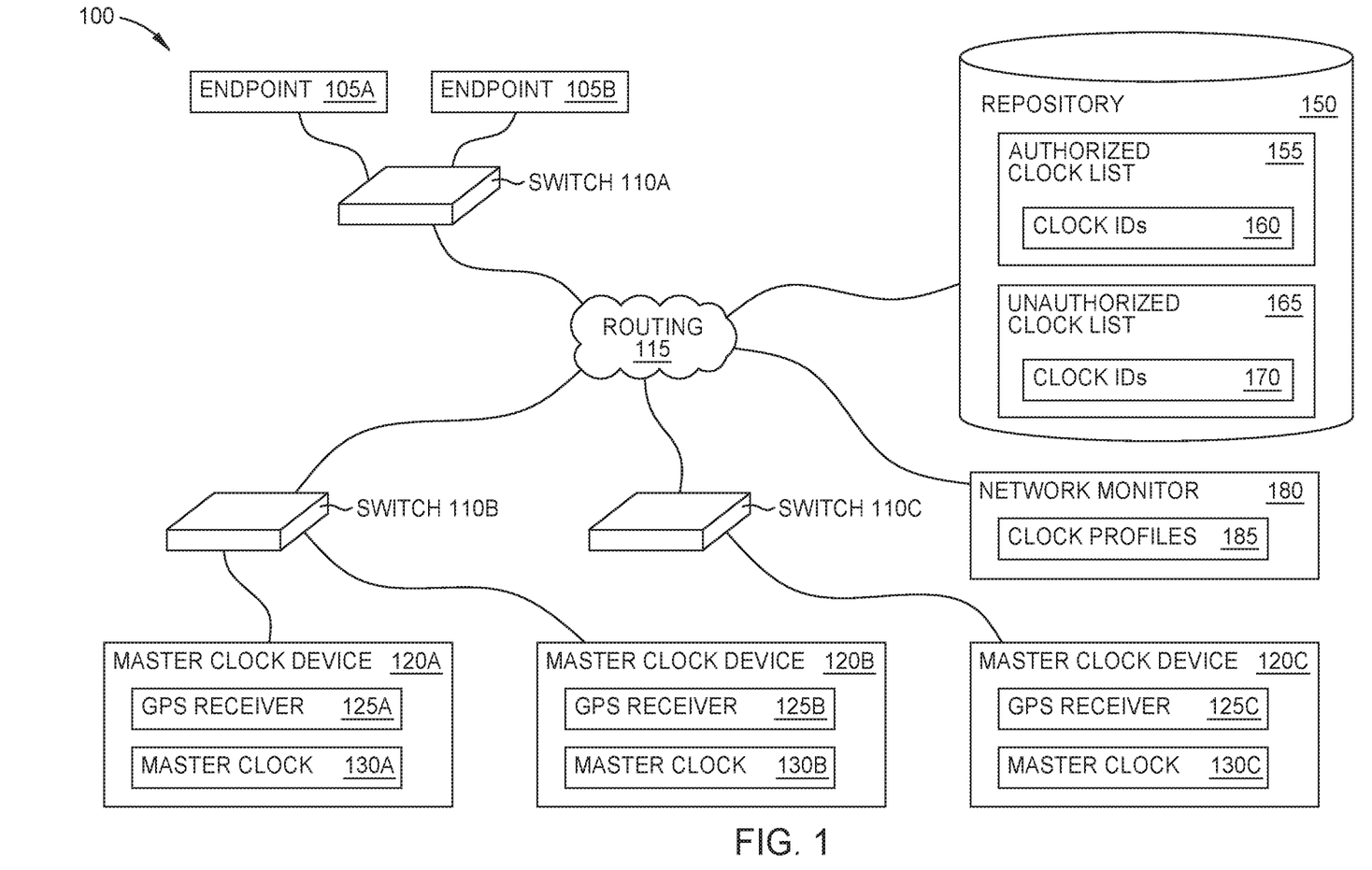
FIG. 1 is a block diagram of a secure master clock selection network, according to one embodiment described herein.

FIG. 1 is a block diagram of a secure master clock selection network 100, according to one embodiment described herein. The network includes endpoints 105A and 105B (hereinafter "endpoints 105") that each includes a clock (not shown) that is synchronized to a master clock. The endpoints 105 can be any device containing a clock that is synchronized to an external master clock according to a timing protocol. In one embodiment, the endpoints 105 are media nodes such as cameras, audio devices, video encoders, audio encoders, etc.

The endpoints 105 are connected via one or more switches 110A, 110B, 110C (hereinafter "switches 110") to routing 115 that can include any number of network devices (e.g., switches or routers) arranged in any number of layers or hierarchies. The network 100 also includes master clock devices 120A, 120B, and 120C (hereinafter "master clock devices 120") that each include a master clock 130 and may include a global positioning system (GPS) receiver 125. In one embodiment, the master clock devices 120 are specialized devices for generating PTP data which includes timestamps corresponding to the master clocks 130. In one embodiment, the master clock devices 120 are appliances designed for PTP applications. The number of endpoints 105, switches 110, master clock devices 120 (along with their GPS receivers 125 and master clocks 130) illustrated in FIG. 1 are not intended to be limiting. Any number of these elements can be included in the system and the number of endpoints 105, switches 110, and master clock devices 120 do not have to be the same.

The GPS receivers 125 are configured to receive GPS signals which have timestamps (or clock information). The master clock devices 120 can then synchronize a respective master clock 130 to clock information provided by GPS. Although one master clock device 120 is sufficient, providing additional master clock devices 120 provides redundancy if one fails, is upgraded, or is otherwise unavailable. That is, the endpoints 105 select one of the master clock devices 120 as the master clock. However, when that master clock fails or is otherwise unavailable, the endpoints 105 then select a new master clock from one of the other master clock devices 120 (referred to as candidate master clocks).

While FIG. 1 illustrates using the master clock devices 120 as the candidates for the master clock, other types of devices may be selected as the master clock. For example, the switches 110 may have boundary clocks that can be selected as the master clock if, e.g., the master clock devices 120 are all unavailable. Moreover, the endpoints 105 may have clocks that can be selected as the master clock. Thus, the candidate master clocks are not limited to the master clock devices 120.

As mentioned above, a nefarious actor can plug a rogue clock device into one of the switches 110 (or other network device within the routing 115). When first developed, PTP and NTP were targeted to small networks such as networks associated with cell towers where access to the network was extremely difficult due to physical security barriers. However, as the use of PTP and NTP has spread to other applications such as media production, the size of the networks has grown as well. Now PTP and NTP can be used on large local area networks (LAN) and wide area networks (WAN). These larger networks are much easier targets for nefarious actors. The switches 110 and the master clock devices 120 may be located in physical locations that are easily accessible to both authorized and unauthorized people. For example, an employee may unwittingly plug in a device into the network that functions as a rogue clock. Alternatively, a nefarious actor may connect a rogue clock into one of the switches 110 that is configured in a manner to make it an attractive candidate master clock to the endpoints 105. For example, the BMC algorithm in PTP requires each candidate clock to broadcast an announce message with certain information that enables the endpoints 105 to individually select the next master clock. Because the endpoints 105 use the same BMC algorithm, they each select the same candidate clock as the next master clock (assuming the endpoints 105 receive the same announce messages). However, a nefarious actor may configure the announce message broadcast by a rogue clock to almost guarantee the rogue clock is selected as the next master clock. For example, the BMC algorithm uses assigned priorities and clock types (as well as other information) to select the master clock. The nefarious actor can configure the rogue clock to transmit an announce message indicating it has the highest priority or is the best type of clock device, even when it is not. In this manner, the rogue clock may appear to the endpoints 105 as the best candidate clock even though the information provided in its announce message was fabricated by the nefarious actor.

Because limiting physical access to the switches 110 in order to completely prevent a rogue clock from being connected to the network 100 may be difficult or impossible, the embodiments herein use an authorized clock list 155 to prevent a rogue clock from being selected as a master clock. That is, if a rogue clock is accidentally or maliciously connected to the network 100, the network 100 can identify the rogue clock and ensure it is not used as a master clock. Moreover, if a nefarious actor gains access to a master clock device 120 and begins to change its configurations (e.g., gain control of the master clock device 120), the network 100 can detect the device 120 is being tampered with and can remove the device 120 from the authorized clock list 155.

The network 100 includes a network monitor 180 (e.g., a software application) to detect suspicious activity and update the authorized clock list 155. As described in more detail below, the network monitor 180 is configured to generate clock profiles 185 for each of the authorized clocks (e.g., the three master clocks 130 in the master clock devices 120 and other candidate clocks disposed in the switches 110 or the endpoints 105). The clock profiles 185 may store parameters associated with authorized clocks such as their location in the network 100, the status of the switch ports they are connected to, output clocks, whether they have been disconnected/reconnected to the network 100, clock ID, MAC address, etc. The network monitor 180 can constantly monitor these parameters to determine when they change—e.g., the master clock device 120A is disconnected from the network 100 but then reconnects later, or the master clock device 120B has a different MAC address. These changes can indicate an authorized clock was replaced by a rogue clock, or that an authorized clock has been tampered with. In either case, the network monitor 180 can remove the suspicious clock from the authorized clock list 155 which means the endpoints 105 cannot select that clock as the master clock.

The network 100 includes a repository 150 (e.g., a database or other data structure that can be queried and updated) that stores the authorized clock list 155 and an unauthorized clock list 165. In this example, the authorized clock list 155 stores one or more clock IDs 160 that identify the master clocks connected to the network 100 that are authorized candidates to become the master clock. If the clock ID 160 of a candidate master clock is not in the authorized clock list 155, the endpoints 105 do not select that candidate master clock as the new master clock.

The clock IDs 160 can be unique IDs that are assigned to the master clocks (e.g., the master clocks 130) or are derived from information corresponding to the master clock devices 120. As an example of the former, the clock IDs 160 may be MAC addresses of the master clock devices 120 or other types of identifying data. However, a MAC address may be spoofed. For example, a nefarious actor may spoof the MAC address of a rogue clock to match a MAC address of an authorized clock. Thus, the endpoints 105 may mistakenly believe they are selecting the authorized clock as the grand master, but in fact, are selecting the rogue clock as the grand master. One solution is to encrypt the authorized clock list 155 so that a nefarious actor cannot identify the clock IDs 160 of the authorized clocks and then spoof those clock IDs. Also, data communication between the endpoints 105 and the repository 150 can be encrypted, as well as data communication between the repository 150 and the network monitor 180. That way, when the endpoint 105 queries the repository 150 to retrieve the encrypted authorized clock list 155 (which can be stored in an encrypted state in the repository 150 or be encrypted before being transmitted by the repository 150), a nefarious actor cannot intercept the authorized clock list 155 and identify the clock IDs 160. Similarly, when the network monitor 180 updates the authorized clock list 155 by adding new authorized clock IDs 160 or removing clock IDs 160, these communications can be encrypted so that a nefarious actor does not know which devices are included in the authorized clock list 155.

In one embodiment, rather than using information that is spoofable to generate the clock IDs 160, the clock IDs 160 may include fingerprints that are derived from several parameters corresponding to the authorized master clocks. For example, the fingerprints may be generated from information contained in the announce messages such as the clock ID, IP address, Priority 1 and Priority 2 settings (which can be user defined and indicate the priority of the candidate master clock), or other secure identifiers which may include a hash of the clock's information. The endpoints 105 can use the information in the announce messages to generate fingerprints for the candidate clocks. These fingerprints can then be compared to the fingerprints (e.g., clock IDs 160) stored in the repository 150 to determine if they match.

Alternatively, or in addition to the information in the announce messages, the fingerprints can be derived from network properties of the devices hosting the candidate master clocks such as their network configuration or location (e.g., particular port they are coupled to, switch they are connected to, IP address, subnet, etc.). The network properties can be combined in a manner to yield a fingerprint that uniquely identifies each candidate master clock. By combining multiple types of configuration data or parameters into a fingerprint to serve as a clock ID 160, these clock IDs 160 may be more difficult to replicate or spoof by a rogue clock. In any case, the embodiments herein can be used with any type of data that can be used as unique clock IDs 160, whether the IDs are based on a single parameter (e.g., a predefined ID or a MAC address) or a combination of multiple parameters (e.g., a fingerprint).

The repository 150 also includes an unauthorized clock list 165 that stores clock IDs 170 of candidate master clocks that are specifically blacklisted from becoming a master clock. That is, while the authorized clock list 155 can be thought of as a whitelist, the unauthorized clock list 165 can be a blacklist that may include clock IDs 170 of rogue or unapproved clocks. In one embodiment, the clock IDs 170 are generated using the same process and techniques described above for generating the clock IDs 160, but a different reference number is provided for the clock IDs 170 to designate that these clock IDs 170 have been blacklisted. For example, if the network monitor 180 identifies a clock in the network 100 that is not authorized, the monitor 180 may add an ID of the clock into the unauthorized clock list 165. In one embodiment, if the network monitor 180 discovers a new clock, the network monitor 180 may automatically add the clock ID of that clock to the clock IDs 170 stored in the unauthorized clock list 165. Later, a system administrator can instruct the network monitor 180 to move the clock ID to the authorized clock list 155. That is, the default action for the network monitor 180 may be to assign newly discovered clocks to the unauthorized clock list 165 until a system administrator with sufficient privileges tells the network monitor 180 that the new clock is an authorized clock.

In one embodiment, the unauthorized clock list 165 is optional. That is, the network monitor 180 may maintain and store only the authorized clock list 155. In this embodiment, clock IDs 160 can be removed from the authorized clock list 155, but these removed clock IDs may not be stored in a separate list—e.g., the unauthorized clock list 165.

Figure 2:
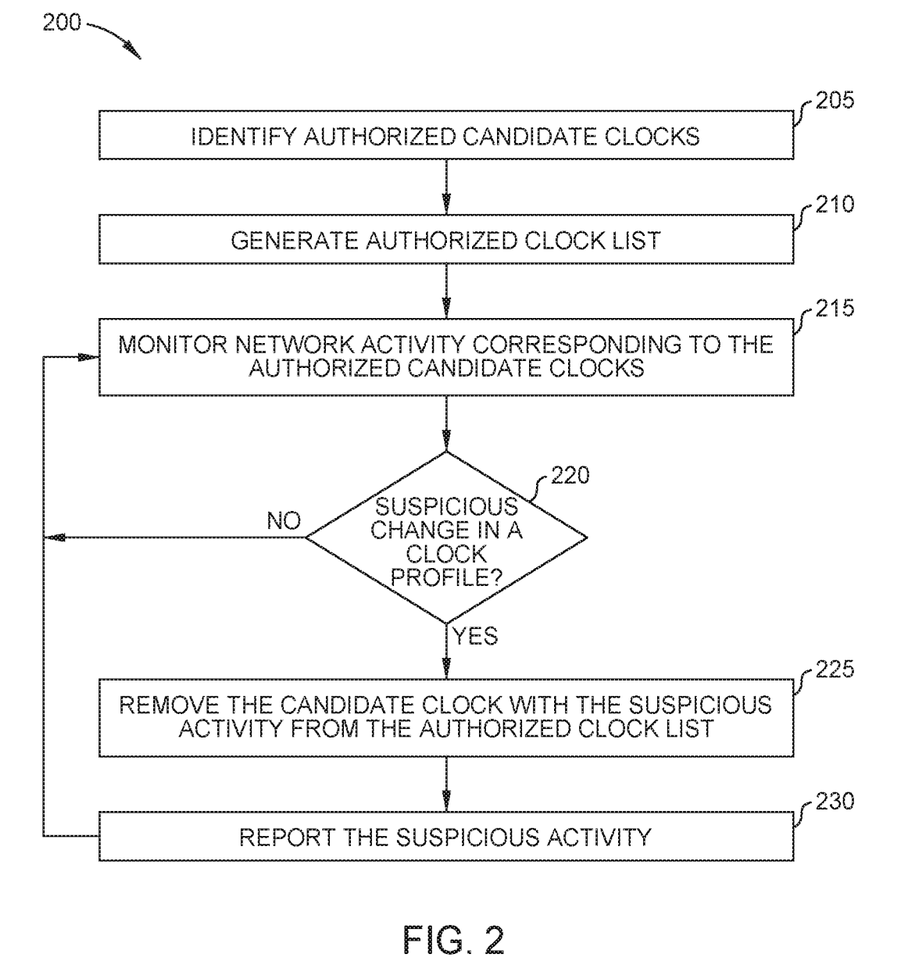
FIG. 2 is a flowchart for generating and maintaining a list of authorized clocks, according to one embodiment described herein.

FIG. 2 is a flowchart of a method 200 for generating and maintaining a list of authorized clocks, according to one embodiment described herein. At block 205, the network monitor identifies authorized candidate clocks. In one embodiment, a system administrator informs the network monitor of the candidate master clocks in the network that are authorized to be a master clock. In another embodiment, when first activated, the network monitor may assume that any candidate clocks it detects are authorized. For example, when the network is first established and begins to operate, the network monitor may assume that any master clock coupled to the network have been authorized by a system administrator.

At block 210, the network monitor generates the authorized clock list. To do so, the network monitor identifies (or generates) clock IDs for the authorized candidate clocks and then stores these clock IDs in the repository to form the list of authorized clocks. For example, if the clock ID is a fingerprint based on multiple parameters, the network monitor can identify these parameters and then generate the fingerprint which is then stored in the authorized clock list. The repository can then be queried by the endpoints so the endpoints can determine whether candidate clocks are authorized to become the master clock. The details describing how candidate clocks can use the information in the authorized clock list to select a master clock are described in FIGS. 4 and 5.

In addition to generating the authorized clock list, the network monitor can generate clock profiles for the authorized clocks. As mentioned above, the clock profiles can store parameters associated with authorized clocks such as their location in the network, the switch they are connected to, the ports they use, a clock ID, a MAC address, etc. In one embodiment, the clock profiles store or describe states of the authorized clocks at the time when the clock profiles are created. If the state changes, this may indicate suspicious behavior—e.g., the authorized clock was tampered with or replaced with a rogue clock.

At block 215, the network monitor monitors network activity corresponding to the authorized candidate clocks. For example, the network monitor may determine when the authorized clock is disconnected from the network (either physically or during a restart). The network monitor may determine when the port on the switch that is connected to the master clock is deactivated. In another embodiment, the network monitor may periodically check the clock signal generated by the authorized clock to ensure it advances as expected. If not, this may be an indication of tampering or that the clock was replaced. The details and techniques for monitoring the authorized candidate clocks are discussed in more detail in FIG. 3.

At block 220, the network monitor determines whether there was a suspicious change in a clock profile. In one embodiment, the network monitor uses the clock profile to identify a change to the state or parameter of the authorized clock. While some changes may not be suspicious (e.g., a small jump in the clock signal or a restart), others are (e.g., a change in the MAC address or movement to a different port). Further, one change may not be sufficient to indicate suspicious activity, but if a threshold number of changes is detected, the network monitor may determine the changes, as a whole, indicate suspicious activity. In one embodiment, the network monitor assigns different weights to parameters and only activity exceeding the predetermined threshold is flagged as suspicious. However, in one embodiment, the network monitor flags all suspicious activity.

If no suspicious activity is detected, the method 200 returns to block 215 where the network monitor continues to monitor the authorized candidate clocks. If suspicious activity is detected, however, the method 200 proceeds to block 225 where the network monitor removes the candidate clock with the suspicious activity from the authorized clock list. As a result, the endpoints will not select that candidate clock as a master clock. In one embodiment, the network monitor adds the clock with the suspicious activity to an unauthorized clock list, although this is not requirement.

At optional block 230, the network monitor reports the suspicious activity to a system administrator. For example, the network monitor may generate an alert to the system administrator regarding the suspicious activity. The system administrator can then investigate the change and determine whether the previously authorized clock was tampered with, or a rogue clock was connected to the network. If the system administrator determines that the previously authorized clock was not tampered with or that the clock is not a rogue clock, the system administrator can inform the network monitor to add the clock back to the authorized clock list.

In one embodiment, the network monitor also monitors the properties of the currently selected master clock (i.e., the grand master clock). The network monitor may instruct a switch to disable an interface port when it has determined a change in clock activity of the currently selected master clock may threaten the integrity of the clock distribution—e.g., if a current master is determined to have a change in parameters (Priorities, switch port, MAC address, etc.) that possibly indicate that the current grand master clock may be tampered with or has become unstable. The network monitor may instruct the switch to disable the port used by the selected master clock in order to force the system to choose a new master clock (from the authorized list).

Figure 3:
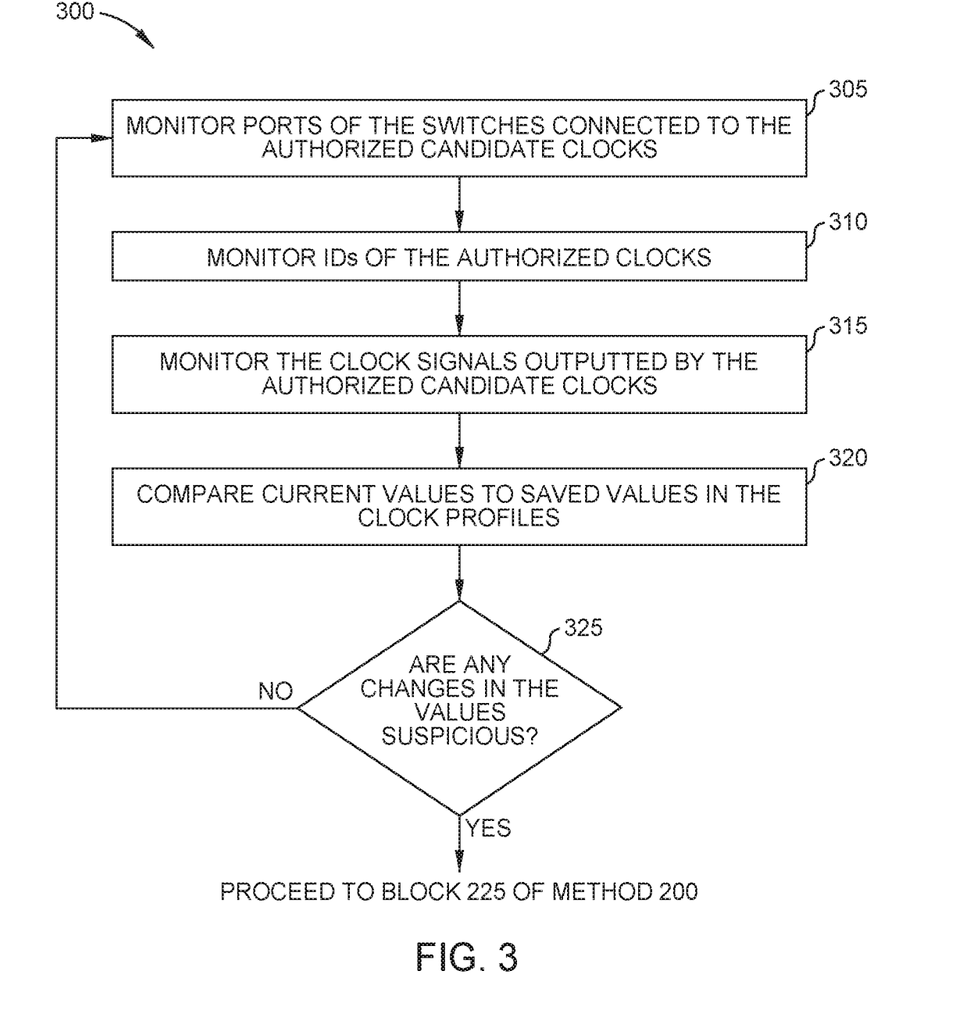
FIG. 3 is a flowchart for identifying suspicious activity related to the authorized clocks, according to one embodiment described herein.

FIG. 3 is a flowchart of a method 300 for identifying suspicious activity related to the authorized clocks, according to one embodiment described herein. In one embodiment, the method 300 illustrates in more detail different techniques for performing block 215 in the method 200 where the network monitor monitors network activity corresponding to the authorized candidate clocks. The network monitor may perform one, some, or all of the blocks 305, 310, 315 to determine whether there is suspicious activity regarding one of the authorized candidate clocks.

At block 305, the network monitor monitors ports of the switches connected to the authorized candidate clocks. That is, the clock profile may indicate which port (or ports) of a switch is connected to the device (e.g., a master clock device, switch, or endpoint) that hosts the authorized candidate clock. The network monitor can periodically check for status changes of the port, e.g., whether the port has been deactivated and then reactivated or whether the device has been unplugged and then plugged back into the port. While a port being deactivated/reactivated may indicate suspicious activity, it might not be. For example, the port may have deactivated due to a power loss or because the authorized clock has to restart after being upgraded or due to a software issue. Thus, the network monitor may consider multiple factors (or multiple changes in those factors) before determining that a change to the port status is suspicious.

The network monitor can also monitor the location of the authorized clock in the network. For example, the network monitor may identify when a device hosting an authorized clock moves to a different port in the switch, or moves to a port in a different switch.

At block 310, the network monitor monitors IDs of the authorized clocks such as their clock IDs, MAC addresses, IP addresses, subnet, etc. Changes to these IDs may indicate suspicious activity such as the authorized clock being replaced with a rogue clock or that someone has tampered with the settings of the authorized clock.

At block 315, the network monitor monitors the clock signals outputted by the authorized candidate clocks. For example, instead of advancing as expected, the clock signal may jump unexpectedly. This many indicate a nefarious actor is changing the authorized candidate clock to cause a problem in the network. For example, advancing the authorized candidate clocks for some network devices in the network but not others may result in those network devices being unable to communicate due to the clock offset.

At block 320, the network monitor compares the current values to saved values in the clock profiles. In this manner, the network monitor can detect a change to the parameters, or a change in the state of the authorized candidate clocks. Once a change is identified, the network monitor can compare the change to a predefined list of changes that indicate suspicious activity. For example, the predefined list may indicate which changes (when occurring in isolation) indicate suspicious behavior, but which do not. The predefined list may also provide thresholds where multiple changes can indicate there is suspicious behavior, but changes less than the threshold are not identified as suspicious behavior.

At block 325, the network monitor determines whether there are any changes and whether those changes are deemed as being suspicious. If there is suspicious activity, the method 300 proceeds to block 225 of the method 200, but if not, the method 300 returns to block 305 where the network monitor continues to monitor the authorized candidate clocks.

Figure 4:
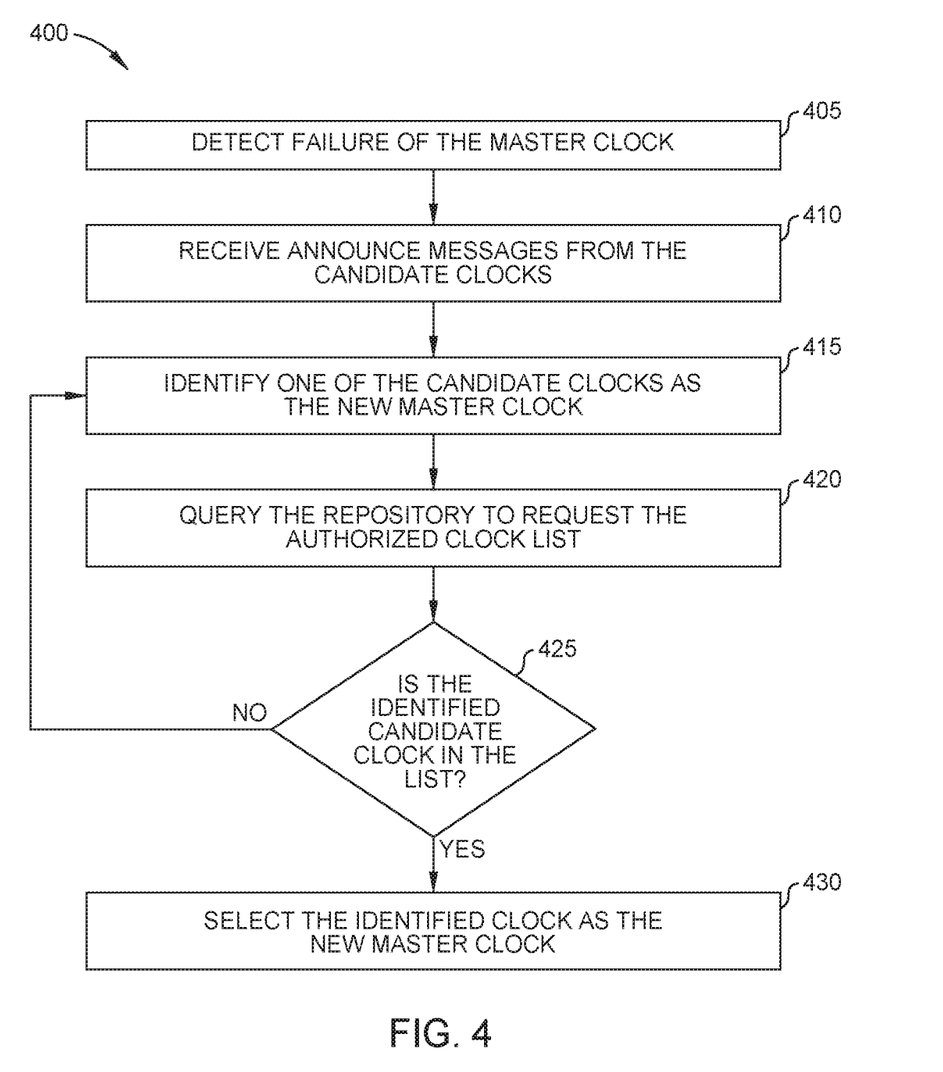
FIG. 4 is a flowchart for using an authorized clock list to select a new master clock, according to one embodiment described herein.

FIG. 4 is a flowchart of a method 400 for using an authorized clock list to select a new master clock, according to one embodiment described herein. At block 405, the candidate clocks in the network detect a failure of the master clock. For example, the candidate clocks may no longer receive the timestamps periodically transmitted by the master clock. In response, the candidate clocks begin to transmit announce messages to the endpoints which contain information the endpoints can use to select the next master clock (e.g., the BMC algorithm defined by PTP). These announce message can include a priority corresponding to the candidate clock, a type of the clock (e.g., whether it includes a GPS receiver or is a boundary clock), and other types of information.

However, as mentioned above, rogue clocks can also send announce messages. The endpoint may not be able to distinguish an announce message from a rogue clock from an announce message from an authorized clock. Thus, the method 400 provides techniques for the endpoints to select an authorized clock as the next master clock.

The endpoints can also detect when a master clock has failed and a new master clock needs to be selected. In one embodiment, the method 400 is performed individually by each PTP- or NTP-enabled endpoint in the network to select a new master clock.

At block 410, the endpoints receive the announce messages from the candidate clocks (e.g., both authorized clocks as well as possible rogue clocks).

At block 415, the endpoints identify one of the candidate clocks as the new master clock. While in PTP each endpoint individually applies the BMC algorithm to identify the next clock, in other embodiments or protocols, the endpoints may communicate with each other in order to identify the next master clock. Thus, the embodiments herein are not limited to one particular algorithm or technique for identifying the new master clock.

At block 420, the endpoints query the repository to request the authorized clock list. In response, the repository transmits an up to date version of the authorized clock list to the endpoints. In one embodiment, to ensure the list is not obtained by a nefarious actor, the endpoints may need to authenticate themselves to the repository (e.g., using a secure login or handshake) before the repository transmits the authorized clock list to the endpoints. Further, the authorized clock list may be encrypted so that only the endpoints can read the data. Thus, if the list is intercepted by the nefarious actor, he cannot obtain the clock IDs from the encrypted data, which makes it more difficult for the nefarious actor to remove an authorized clock and replace it with a rogue clock with the same clock ID.

At block 425, the endpoints determine whether the identified candidate clock is in the authorized clock list. That is, the endpoints check to ensure the clock they identified to be the new master clock has a clock ID contained in the authorized clock list. In one embodiment, the endpoints use the information in the announce messages to generate the clock ID for the identified candidate clock. Thus, the endpoints can compare the clock ID of the identified candidate clock to the clock IDs in the list to see if there is a match. However, in other embodiments, the clock ID may be predefined IDs assigned to the candidate master clocks or be derived from network properties of the clocks.

While the method 400 illustrates retrieving the authorized clock list from the repository, it may be more secure to instead send the clock ID of the identified candidate clock to the repository. The repository can then check whether the clock ID is included in the authorized clock list, and if not, inform the endpoints they should identify a different candidate clock. In this example, the list never leaves the repository which may increase security when compared to transmitting the list to the endpoints.

If the clock ID for the candidate clock is not in the list, the method 400 returns to block 415 where the endpoints identify the next best candidate clock and determine whether the clock ID for that clock is included in the authorized clock list. Once the endpoints identify a candidate clock that is included in the authorized clock list, the method proceeds to block 430 where the endpoints select the identified clock as the new master clock. The endpoints can then synchronize their clocks to the master clock.

Figure 5:
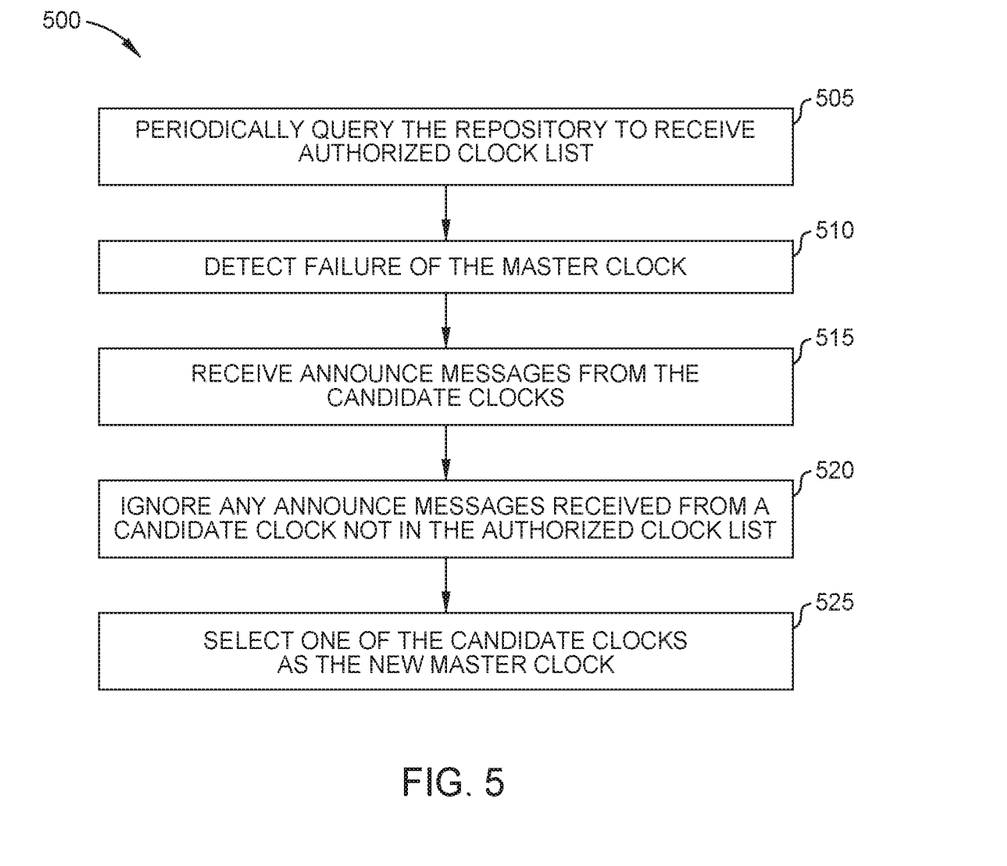
FIG. 5 is a flowchart for using an authorized clock list to select a new master clock, according to one embodiment described herein.

FIG. 5 is a flowchart of a method 500 for using an authorized clock list to select a new master clock, according to one embodiment described herein. The method 500 differs from the method 400 in that rather than querying the repository after identifying a candidate clock, the endpoints already have a copy of the authorized clock list.

At block 505, the endpoints periodically query the repository to receive the authorized clock list. For example, the endpoints may query the repository to request an up-to-date copy of the authorized clock list daily, hourly, every minute, etc. As above, the authorized clock list can be sent securely to the endpoints, which store the authorized clock list in their memory.

At block 510, the candidate clocks and the endpoints detect the failure of the master clock, which was discussed at block 405 of method 400 and is not repeated here.

At block 515, the endpoints receive announce messages from the candidate clocks, which was discussed at block 410 of method 400 and is not repeated here.

At block 520, the endpoints ignore any announce messages received from a candidate clock not in the authorized clock list stored in their memory. That is, as the announce messages are received, the endpoints can generate clock IDs for the candidate clocks using the information contained in the announce messages or from the network properties of the clocks. The endpoints can then ignore any announce messages received from candidate clocks that do not have clock IDs contained in the authorized clock list. Put differently, since the endpoints already have a copy of the authorized clock list, they can prune the announce messages to consider only the candidate clocks that are contained in the authorized clock list.

At block 525, the endpoints select one of the candidate clocks as the new master clock using any of the techniques discussed above at block 415 to identify a master clock and synchronize their local clocks to the new master clock. However, unlike in method 400, the endpoints have already eliminated unauthorized candidate clocks from the pool of potential clocks that can become the new master clock. Thus, any candidate clock selected at block 525 is authorized to become the master clock.

In one embodiment, the method 500 may be preferred when it is desired to select the new master clock as fast as possible. Since the authorized clock list is already stored in memory, there is no latency involved with querying the repository to ensure the selected candidate master clock is on the authorized clock list. However, if the application is not time sensitive, the method 400 may be preferred since it ensures the endpoints use the most up-to-date version of the authorized clock list when selecting the new master clock. That is, in the method 500, the locally stored authorized clock lists may be stale and include clocks that have recently been removed from the list, or not include new clocks that have recently been authorized.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a plurality of candidate master clocks connected to a network, wherein at least one clock ID for each of the plurality of candidate master clocks is stored in an authorized clock list;
   monitoring network activity corresponding to the plurality of candidate master clocks;
   determining suspicious activity associated with a first clock of the plurality of candidate master clocks;
   removing a clock ID of the first clock from the authorized clock list; and
   selecting, using the clock IDs remaining in the authorized clock list, a master clock from the plurality of candidate master clocks.

2. The method of claim 1, further comprising:
   generating clock profiles for the plurality of candidate master clocks, wherein the clock profiles store states of the plurality of candidate master clocks; and
   identifying, based on monitoring the network activity, a change to a state of the first clock which indicates suspicious activity.

3. The method of claim 1, wherein monitoring the network activity comprises:
   monitoring at least one of a status or a location of each of the plurality of candidate master clocks; and
   identifying a change in at least one of the status or the location of the first clock, indicating suspicious activity associated with the first clock.

4. The method of claim 1, wherein monitoring the network activity comprises:
   monitoring one or more ports of one or more network devices connected to the plurality of candidate master clocks; and identifying a change in status of at least one of the ports of a network device connected to the first clock, indicating suspicious activity associated with the first clock.

5. The method of claim 1, wherein removing the clock ID of the first clock from the authorized clock list comprises:
transmitting an instruction to a repository storing the authorized clock list, wherein the repository is accessible by a plurality of endpoints connected to the network, wherein the plurality of endpoints select the master clock.

6. The method of claim 1, further comprising:
receiving announce messages from the plurality of candidate master clocks at an endpoint, wherein the endpoint selects the master clock from the plurality of candidate master clocks; and
synchronizing a clock on the endpoint to the master clock after confirming the master clock is included within the authorized clock list.

7. The method of claim 6, further comprising:
generating a first clock ID for each of the plurality of candidate master clocks based on information contained in the announce messages; and
comparing the first clock IDs to second clock IDs provided in the authorized clock list, wherein a candidate master clock is not authorized to become the master clock unless the first clock ID thereof matches one of the second clock IDs.

8. A non-transitory computer-readable medium containing computer program code that, when executed by operation of one or more computer processors, performs an operation comprising:
identifying a plurality of candidate master clocks connected to a network, wherein at least one clock ID for each of the plurality of candidate master clocks is stored in an authorized clock list;
monitoring network activity corresponding to the plurality of candidate master clocks;
determining suspicious activity associated with a first clock of the plurality of candidate master clocks; and
removing a clock ID of the first clock from the authorized clock list, wherein the first clock is no longer a candidate master clock once removed from the authorized clock list.

9. The non-transitory computer-readable medium of claim 8, the operation further comprising:
generating clock profiles for the plurality of candidate master clocks, wherein the clock profiles store states of the plurality of candidate master clocks; and
identifying, based on monitoring the network activity, a change to a state of the first clock which indicates suspicious activity.

10. The non-transitory computer-readable medium of claim 8, wherein monitoring the network activity comprises:
monitoring at least one of a status or a location of each of the plurality of candidate master clocks; and
identifying a change in at least one of the status or the location of the first clock, indicating suspicious activity associated with the first clock.

11. The non-transitory computer-readable medium of claim 8, wherein monitoring the network activity comprises:
monitoring one or more ports of one or more network devices connected to the plurality of candidate master clocks; and
identifying a change in status of at least one of the ports of a network device connected to the first clock, indicating suspicious activity associated with the first clock.

12. The non-transitory computer-readable medium of claim 8, wherein removing the clock ID of the first clock from the authorized clock list comprises:
transmitting an instruction to a repository storing the authorized clock list, wherein the repository is accessible by a plurality of endpoints connected to the network, wherein the plurality of endpoints select the master clock.

13. The non-transitory computer-readable medium of claim 8, the operation further comprising:
receiving announce messages from the plurality of candidate master clocks at an endpoint;
selecting a master clock from the plurality of candidate master clocks; and
synchronizing a clock on the endpoint to the master clock after confirming the master clock is included within the authorized clock list.

14. The non-transitory computer-readable medium of claim 13, the operation further comprising:
generating a first clock ID for each of the plurality of candidate master clocks based on information contained in the announce messages; and
comparing the first clock IDs to second clock IDs provided in the authorized clock list, wherein a candidate master clock is not authorized to become the master clock unless the first clock ID thereof matches one of the second clock IDs.

15. A system, comprising:
a network;
a plurality of candidate master clocks connected to the network, wherein at least one clock ID for each of the plurality of candidate master clocks is stored in an authorized clock list;
a network monitor configured to:
monitor network activity corresponding to the plurality of candidate master clocks,
determine suspicious activity associated with a first clock of the plurality of candidate master clocks, and
remove a clock ID of the first clock from the authorized clock list, wherein the first clock is no longer a candidate master clock once removed from the authorized clock list; and
a plurality of endpoints connected to the network and configured to select, using the clock IDs remaining in the authorized clock list, a master clock from the plurality of candidate master clocks.

16. The system of claim 15, wherein the network monitor is configured to:
generate clock profiles for the plurality of candidate master clocks, wherein the clock profiles store states of the plurality of candidate master clocks; and
identify, based on monitoring the network activity, a change to a state of the first clock which indicates suspicious activity.

17. The system of claim 15, wherein monitoring the network activity comprises:
monitoring at least one of a status or a location of each of the plurality of candidate master clocks; and
identifying a change in at least one of the status and the location of the first clock, indicating suspicious activity associated with the first clock.

18. The system of claim 15, wherein monitoring the network activity comprises:

Monitoring one or more ports of one or more network devices connected to the plurality of candidate master clocks; and identifying a change in status of at least one of the ports of a network device connected to the first clock, indicating suspicious activity associated with the first clock.

19. The system of claim 15 wherein removing the clock ID of the first clock from the authorized clock list comprises:

transmitting an instruction to a repository storing the authorized clock list, wherein the repository is accessible by a plurality of endpoints connected to the network, wherein the plurality of endpoints select the master clock.

20. The system of claim 15, wherein the plurality of endpoints are configured to:

receive announce messages from the plurality of candidate master clocks;

synchronize clocks on the plurality of endpoints to the master clock after confirming the master clock is included within the authorized clock list.

\* \* \* \* \*